Patented Oct. 26, 1943

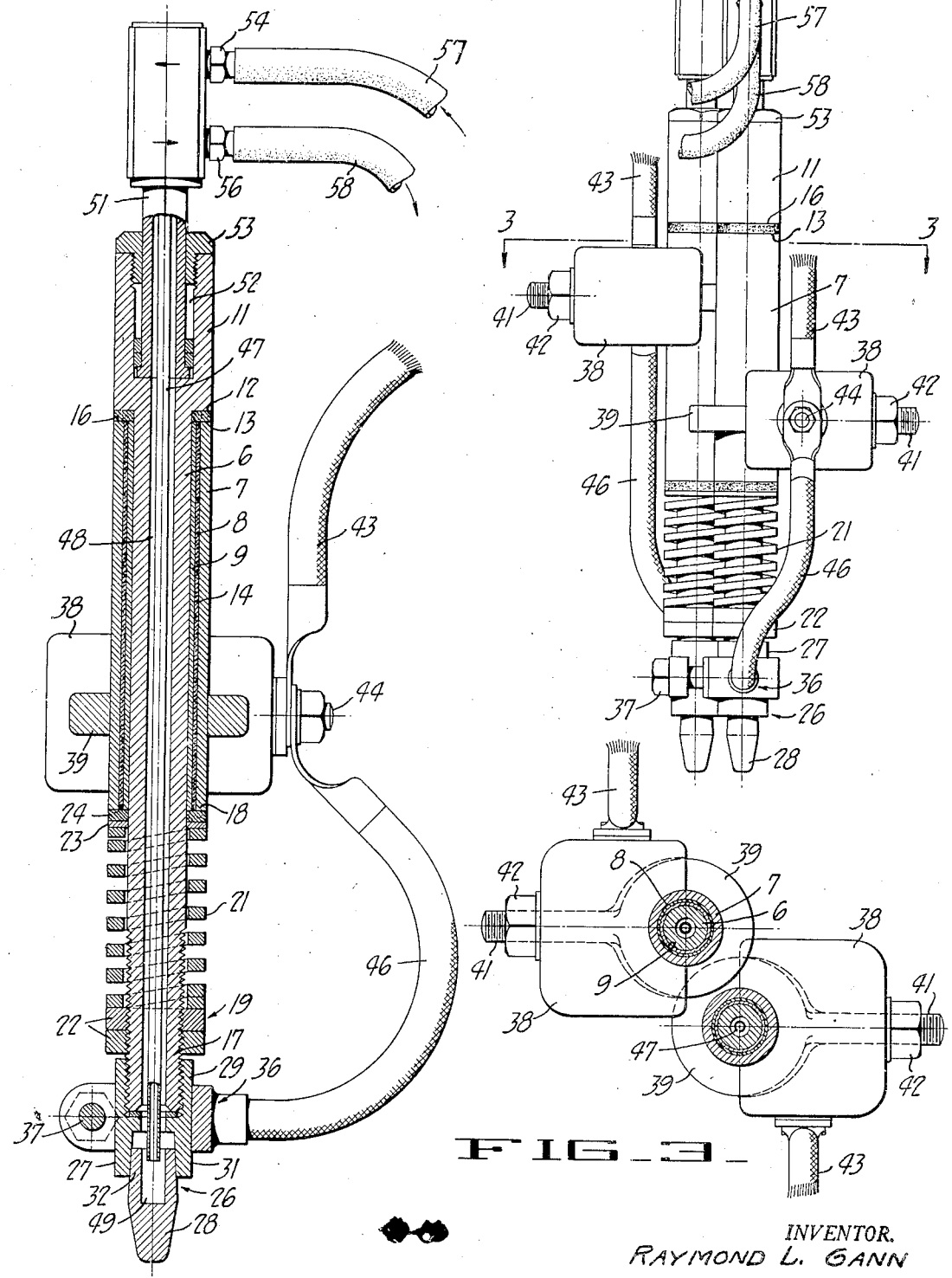

2,332,789

UNITED STATES PATENT OFFICE 2,332,789

SPOT WELDER ELECTRODE HOLDER

Raymond L. Gann, Chicago, Ill., assignor to Rheem Manufacturing Company, Richmond, Calif., a corporation of California Application June 24, 1942, Serial No. 448,310

5 Claims. (Cl. 219—4)

The invention relates to spot welding apparatus and more particularly to the construction of the welder electrode holder of such apparatus.

As will be understood, the welding head in a spot or resistance type welder is commonly constructed of the combination of a support and a relatively movable electrode carried by the support and resiliently pressed to an extended position with respect to the support, so as to permit the pressing of the electrode against the work to be welded with a relatively great force. Frequently the welding heads are provided in a multiple arrangement, whereby the same move to and from the work as a unit and the resilient connection between the electrode and its support permits the firm, positive and simultaneous engagement of all of the electrodes with the work. As will be further appreciated, so-called resistance or spot welding is effected by the use of a relatively large current transmission through the work to be welded. In former electrode holders this large current was caused to traverse the relatively movable parts of the holder and considerable difficulty and damage has been encountered by reason of the arcing of the current between contacting faces of the moving parts and the attendant pitting and wearing of these surfaces as well as in the premature fatigue and wearing out of flexible electrical conductors necessarily used between certain of the relatively moving parts. In accordance with the present invention and as a principal object thereof, I have provided a spot welder electrode holder of the character described which entirely eliminates the disadvantages of former constructions above noted, and wherein the current is fed from the current source directly to the electrode and is not required to pass through the body of the head or between any relatively moving parts in the assembly, and wherein the portion of the assembly adapted for connection to the welding apparatus for support and movement to and from the work, is completely insulated from the electrode whereby the current is prevented from passing through any part of the supporting structure for the electrode.

Another object of the invention is to provide a spot welder electrode holder of the character described, in which advantage is taken of the isolation of current carrying parts to provide a design and construction and a selection of non-current carrying materials affording a stronger and more rugged and positively operating unit which is better adapted to withstand the relatively high and repetitive operating forces and pressures to which the unit is subjected in use.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal sectional view of a spot welder electrode holder constructed in accordance with the present invention.

Figure 2 is a side elevation, on a reduced scale, of a pair of units as illustrated in Figure 1 and shown in operative association for welding.

Figure 3 is a cross-sectional view of the units illustrated in Figure 2 and is taken substantially on the plane of line 3—3 of Figure 2.

The spot welder electrode holder of the present invention consists briefly of a supporting member and a relatively movable electrode carried thereby and resiliently urged to an extended position, in combination with means electrically insulating the electrode from the supporting member and an electric terminal connected to the electrode for supplying electric current exclusively thereto.

With reference more specifically to the accompanying drawing, the spot welder electrode holder therein depicted is composed of telescopically arranged inner and outer members 6 and 7 which are held and supported in concentric relation by an insulation sleeve 8 and a bearing sleeve 9 mounted concentrically between the members, and coterminous with the outer member 7. The inner member 6 is of substantially greater length than the outer member 7 and extends completely through the length of the latter and is provided at its normally upper end portion 11 with an enlarged head thus defining a shoulder 12 opposed to the upper end 13 of the outer member 7 to serve as a stop limiting the relative longitudinal movement of the members. As will be noted from Figure 1, the insulation sleeve, which is preferably of fibre construction, is mounted immediately against the interior wall 14 of the outer casing 7, so as to insulate the latter over its full length, and the bearing sleeve 9, which is preferably constructed of bronze, is mounted between the insulation sleeve and the outside wall of the inner member 6, so as to support the inner member for relative longitudinal reciprocation. An insulation washer 16 is mounted between the shoulder 12 and the outer casing end 13 so as to prevent electrical contact between the enlarged head 11 of the inner member and the outer casing when the two are drawn together.

The opposite end portion 17 of the inner member extends from the lower end 18 of the outer casing, as aforementioned, and is provided in spaced relation to the end 18 with an abutment 19 here serving as a support for one end of a compression spring 21. In the present construction the lower end portion 17 of the inner member is threaded and the abutment 19 is conveniently provided by a pair of nuts 22 threaded onto the lower end portion 17 and locked together. The spring 21 is supported at its upper end on a bearing washer 23 which is in turn supported against an insulation washer 24 positioned against the lower end faces of the outer casing and the insulation and bearing sleeves 8 and 9. In this manner it will be noted that the outer casing 7 is completely insulated over its full interior length and across its ends from the interior member 6.

A welding electrode 26 is operatively connected to the lower end 17 of the inner member and as here shown, the electrode is composed of two sections, including an electrode body 27 and an electrode tip 28. The body 27 is of tubular construction and interiorly threaded at its upper end 29 for threaded attachment to the lower end 17 of the center member and the opposite lower end 31 provides a socket for receipt of a reduced upper end portion 32 of the tip, the arrangement being such that the reduced portion 32 of the tip has a relatively tight sliding fit into the end bore provided in the electrode body.

In accordance with the present invention and as an important feature thereof, electric current is fed directly to the electrode 26, and to this part exclusively and for this purpose I provide directly on the electrode body an electric terminal 36 adapted for connection to the electric lead-in conductor. In the present construction the terminal 36 is in the form of a circular clamp embracing the periphery of the electrode body 27, and held in clamped position by a bolt 37.

As will be clear from the foregoing, the outer casing 7 is adapted to be supported by the welding machine with which it is used for movement to and from the work to be welded, and as will be appreciated, the type of mounting for incorporating the device in the welding heads of various types of welding apparatus will be different. As here shown I provide a mounting block 38 on the outer casing 7 which in the present construction is clamped to the casing by means of an eye bolt 39 surrounding the casing, and having the stud end 41 thereof extending through an opening in the block for drawing the same against the casing by means of a nut 42 threaded on the stud. Preferably advantage is taken of the relatively solid mounting of the casing 7 for the support of the relatively heavy electric lead-in conductor 43, and as here shown I provide on the block 38 a terminal post 44 for connecting the end of the lead-in conductor 43 to an end of a short jumper 46 extending to the terminal clamp 36 on the electrode. In operation it is customary to use a pair of the electrode holder units in adjacent side by side relation as illustrated in Figures 2 and 3. Where the units are so arranged, the mounting blocks 38 for the units are preferably staggered vertically so that the electrodes may be brought to necessary proximity. In operation as will be understood, the units are customarily pressed down against the work to be welded, although in other constructions the work is moved up to the electrodes, and the relative movement between the inner and outer members and the provision of the resilient connection above described, enables the electrodes to be pressed with great force against the work and to adjust themselves to irregularities in height of the work, whereby two or more of the units may be simultaneously and unitarily moved to the work.

Preferably and as here shown, a water cooling system is used for removing heat from the electrodes. A more or less conventional structure is here depicted for this purpose and includes a water inlet tube 47 extending centrally through a center bore provided in the inner member 6 and into a water chamber 49 in the top of the electrode tip, the water returning around the sides of the tube in the bore 48 to a concentric fitting 51 surrounding the tube at its upper end. The fitting is mounted in a receiving chamber 52 in the head end 11 of the inner member and sealed therein by appropriate packing and an end nut 53. The water tube 47 extends through the fitting to a water inlet connection 54 and the returning water is discharged from the fitting through a discharge connection 56. Appropriate inlet and discharge conduits 57 and 58 are connected to the connections 54 and 56 for completing the water circuit.

As above mentioned, advantage is taken in the present construction of the isolation of the current carrying parts to provide a design and construction and selection of non-current carrying materials affording a stronger and more rugged and positively operating unit than has been heretofore obtainable. Because the current is confined in its passage to the electrode, the remaining parts of the device may be constructed of steel or special non-current carrying materials of great strength and toughness. Preferably both the inner and outer members 6 and 7, as well as the spring 21, are formed of relatively high quality steel which gives these parts a substantially unlimited useful life. As will be appreciated, spot welder electrodes of the present character are subjected to relatively high operating forces and pressures and to constant repetition of these forces, with the result that in former devices where the body parts of the unit had to be constructed of current carrying material, early and premature wearing out of the units was inevitable. Furthermore, in the present design a relatively very large degree of movement is permitted the inner member without in any way affecting the passage of current to the electrode.

I claim:

1. A spot welder electrode holder comprising, telescopic members mounted for relative longitudinal displacement, one of said members being adapted for support and movement to and from the work to be welded, the other of said members projecting longitudinally from the first member, resilient means urging the longitudinal extension of said second enumerated member from the first member, electrical insulation means mounted between said members and insulating one from the other, an electrode carried by the second of said members, and electrical terminal means connected to said electrode for supplying current exclusively thereto.

2. A spot welder electrode holder comprising, a pair of telescopically arranged members, concentric insulation and bearing sleeves mounted between said members for electrically insulating the same from each other and providing for relative longitudinal displacement, one of said members being adapted for support and movement to and from the work to be welded, the other of said members extending longitudinally from said first member, spring means urging the longitudinal extension of said second member with respect to the first, an electrode carried by said second member, and electrical terminal means connected to said electrode for supplying current exclusively thereto.

3. A spot welder electrode holder comprising, an elongated outer casing adapted for support and movement to and from the work to be welded, an inside longitudinally reciprocating member, insulation and bearing sleeves mounted between said casing and member for insulating one from the other and supporting said member for longitudinal reciprocation, spring means urging the longitudinal extension of said member from said casing, an electrode carried by the extended end of said member, and electrical terminal means connected to said electrode for supplying current exclusively thereto.

4. A spot welder electrode holder comprising, an elongated outer casing adapted for support and movement to and from the work to be welded, an inside longitudinally reciprocating member, insulation and bearing sleeves mounted between said casing and member for insulating one from the other and supporting said member for longitudinal reciprocation, an abutment on said member in longitudinally spaced relation to one end of said casing, a helical spring surrounding said member and compressed between said abutment and said casing end to urge the longitudinal extension of said member, an electrode carried by the extended end of said member, and electrical terminal means connected to said electrode for supplying current thereto.

5. A spot welder electrode holder comprising, an elongated outer casing adapted for support and movement to and from the work to be welded, an inside longitudinally reciprocating member, insulation and bearing sleeves mounted between said casing and member for insulating one from the other and supporting said member for longitudinal reciprocation, said member extending longitudinally completely through said casing and from the opposite ends thereof, an abutment on said member adjacent one end thereof in spaced relation to one end of said casing, a helical spring surrounding said member and compressed between said abutment and casing end for resiliently urging the longitudinal extension of said member end from said casing, a shoulder provided on said member engageable with the opposite end of said casing for limiting the amount of said longitudinal extension, an electrode mounted on said member end, and electrical terminal means connected to said electrode for supplying current thereto.

RAYMOND L. GANN.